United States Patent
Djoudi

(10) Patent No.: US 12,354,413 B2
(45) Date of Patent: Jul. 8, 2025

(54) METHOD AND DEVICE FOR ABSENTEE VOTING

(71) Applicant: Abdelhakim Djoudi, Montpellier (FR)

(72) Inventor: Abdelhakim Djoudi, Montpellier (FR)

( * ) Notice: Subject to any disclaimer, the term of this patent is extended or adjusted under 35 U.S.C. 154(b) by 14 days.

(21) Appl. No.: 18/548,441

(22) PCT Filed: Mar. 7, 2022

(86) PCT No.: PCT/EP2022/055774
§ 371 (c)(1),
(2) Date: Apr. 1, 2024

(87) PCT Pub. No.: WO2022/184944
PCT Pub. Date: Sep. 9, 2022

(65) Prior Publication Data
US 2024/0144765 A1    May 2, 2024

(30) Foreign Application Priority Data
Mar. 5, 2021    (FR) ...................................... 2102167

(51) Int. Cl.
*G07C 13/00* (2006.01)
*B42D 15/00* (2006.01)
*H04L 9/40* (2022.01)

(52) U.S. Cl.
CPC ............. *G07C 13/00* (2013.01); *B42D 15/00* (2013.01); *H04L 63/0428* (2013.01); *H04L 63/08* (2013.01)

(58) Field of Classification Search
CPC .......... G07C 13/00; B42D 15/00; H04L 63/08
(Continued)

(56) References Cited

U.S. PATENT DOCUMENTS

| 11,670,127 B1 * | 6/2023 | Gatt ........................ G06F 16/34 |
| | | 705/12 |
| 2012/0217299 A1 * | 8/2012 | Fontanals .............. G07C 13/00 |
| | | 235/386 |

(Continued)

FOREIGN PATENT DOCUMENTS

| FR | 2949270 A1 | 2/2011 |
| FR | 3093851 A1 | 9/2020 |

OTHER PUBLICATIONS

EPO Search Report; European Patent Office; Jun. 9, 2022.

*Primary Examiner* — Ahshik Kim
(74) *Attorney, Agent, or Firm* — Patshegen IP; Moshe Pinchas

(57) ABSTRACT

The postal voting method (30) includes:
a step (31) of connecting a user terminal to a first server,
a step (32) of authenticating the user of the user terminal by the first server, and associating a single voting number to the user,
a step (33) of storing by a second server, the user's voting number,
a step (34) of transmitting, by the second server to the user terminal, a ballot validation code,
a step (36) of registering, by the user terminal in an electronic label, information representative of the ballot validation code,
a step (38) of transmitting, by the second server to a counting of votes system, a ballot validation element,
by the counting of votes system, for each voting ballot associated with an electronic label, a step (39) of reading the information representative of the validation code in said electronic label and
a step (40) of verifying correspondence between the information representative of the validation code
(Continued)

read and the validation element received by the counting system and, only if this verification is positive, a step of taking account of the ballot associated with said electronic label.

22 Claims, 5 Drawing Sheets

(58) Field of Classification Search
USPC .......................................................... 235/51
See application file for complete search history.

(56) References Cited

U.S. PATENT DOCUMENTS

2012/0330731 A1* 12/2012 Wagoner ................ G07C 13/00
                                                                                705/12
2018/0114391 A1* 4/2018 Seibel .............. G06K 19/06037

* cited by examiner

METHOD AND DEVICE FOR ABSENTEE VOTING

TECHNICAL FIELD OF THE INVENTION

The present invention is directed to a postal voting method and device. It applies, in particular to advance voting.

STATE OF THE ART

Postal voting poses many technical problems linked to security, in particular guaranteeing the integrity of the form chosen, guaranteeing anonymity, signing, the need to avoid a double vote, or even allowing the voter to change their choice after sending their postal voting ballot.

BRIEF SUMMARY OF THE INVENTION

The present invention aims to remedy all or part of these drawbacks.

For this purpose, according to a first aspect, the present invention is directed to a postal voting method, which includes:

- a step of connecting a user terminal to a first server;
- a step of authenticating the user of the user terminal by the first server, and associating a single voting number to the user;
- a step of storing the user's voting number by a second server;
- a user voting step followed by a step of verifying that it is the first voting step by the user;
- if this is the first user's voting step:
  - a step of transmitting, by the second server to the user terminal, a physical ballot validation code,
  - a step of registering, by the user terminal in an electronic label, information representative of the physical ballot validation code, and
  - a step of transmitting, by the second server to a counting of votes system, a physical voting ballot validation element, the counting of votes system being distinct from the second server;
- by the counting of votes system, for each physical voting ballot associated with an electronic label, a step of reading the information representative of the validation code in said electronic label; and
- a step of verifying correspondence between the information representative of the validation code read and the validation element received by the counting system and, only if this verification is positive, a step of taking account of the ballot associated with said electronic label.

Thus, the physical ballot associated by the user with the ballot validation code is unknown to the different servers, which guarantees confidentiality of the vote. Furthermore, the voting number does not allow the identity of the user to be found, which guarantees anonymity of the vote. Finally, the invention prohibits the same voter from voting twice by associating only one voting number to the user and storing that the user terminal has already received a ballot validation code.

It is noted that the first and second servers can constitute a single server providing the server functions set forth above.

It is also noted that the association of an electronic label with a voting ballot can be done by integrating the electronic label into the voting ballot bearing a possible choice of the voter, by sticking this label on such a voting ballot, by integrating the label into an envelope containing the user's voting ballot or by sticking this label on such an envelope. The present invention is therefore compatible both with manual reporting by visual reading of the choice made by the voter and with electronic reporting with electronic reading of the choice made by the voter.

In embodiments, in the step of transmitting, from the second server to the user terminal, a ballot validation code, the user terminal transmits to the second server a ballot lot number and/or a random number, the second server encrypts each number received from the user terminal and returns it encrypted to the user terminal.

In embodiments, in the step of transmitting, by the second server to the user terminal, a ballot validation code, the user terminal encrypts an identification of the choice of user from the possible choices during election, with, as encryption key, a ballot lot number and/or a random number, and transmits the choice identification encrypted to the second server, the second server encrypting this encrypted choice identification and returning it encrypted to the user terminal.

In embodiments, the method includes, after the step of authenticating the user of the user terminal by the first server, a step of transmitting to the user a plurality of voting ballots, bearing, visibly and legibly to the eye, a possible choice during the election, each voting ballot being physically linked to an electronic label retaining, in memory, the identification of the choice borne by the ballot.

In embodiments, the identification of the choice borne by the ballot is retained encrypted in the memory of the electronic label.

In embodiments, the method includes a step of transmitting, to the user, a first access code to the content of a first part of the memory of each electronic label received by the user, this first part retaining an identifier of the vote and/or an identification of the choice made by the user during the election.

In embodiments, the method includes a step of modifying, by the user terminal, the first code together with the registering step, by the user terminal in an electronic label, information representative of the ballot validation code.

In embodiments, the method includes a step of transmitting, by the second server to the user terminal, a second access code to the content of a second part of the memory of each electronic label received by the user, this second part retaining the information representative of the ballot validation code.

In embodiments, the method includes a step of registering, into memory of each electronic label received by the user, a ballot lot number common to the electronic labels of several users.

In embodiments, the method includes a step of sticking an electronic label on a ballot bearing visible and legible identification of the choice made by the user from the choices available during the election, a step of capturing an image of the ballot bearing the electronic label stuck, a step of encrypting this image, and a step of storing the electronic label of this encrypted image into memory together with the step of registering, by the user terminal in an electronic label, information representative of the ballot validation code.

In embodiments, the method includes a step of optical character recognition of the identification of the choice made by the user from the possible choices during the election borne by the voting ballot on which the electronic label is stuck and a step of registering, by the user terminal into the memory of the electronic label, information representative of the identification read by optical character recognition.

In embodiments, the method includes a step of sticking an electronic label on an envelope containing the voting ballot bearing visible and legible identification of the choice made by the user from the possible choices during the election.

In embodiments, the method includes a step of transmitting, by the user to a voting place, a voting ballot associated with an electronic label, in an envelope forming a Faraday cage.

According to a second aspect, the present invention targets an electronic label for postal voting by association with a voting ballot, which includes a memory including information representative of a voting ballot validation code.

In embodiments, the information representative of a ballot validation code includes, in an encrypted manner, a ballot lot number and/or a random number.

In embodiments, the information representative of a ballot validation code includes, in an encrypted manner by a ballot lot number and/or a random number, and then by a remote server, an identification of the user's choice among the possible choices during the election.

In embodiments, the memory further includes an image of a voting ballot on which this electronic label is stuck.

In embodiments, the memory further includes information representative of counting, by a ballot box, the vote borne by the ballot.

According to a third aspect, the present invention is directed to a counting of postal votes system by reading an electronic label associated with a voting ballot, which includes a means for reading information representative of a voting ballot validation code in a memory of the electronic label.

In embodiments, the information representative of a ballot validation code includes, in an encrypted manner, a ballot lot number and/or a random number, the counting of votes system including, in addition, a means for receiving an encryption or decryption key corresponding to the encryption implemented to encrypt the voting ballot lot number and/or the random number.

In embodiments, the information representative of a ballot validation code includes, in an encrypted manner by a ballot lot number and/or a random number, then by a remote server, an identification of the user's choice from the possible choices during the election, the counting of votes system further including, a means for receiving encryption or decryption keys corresponding to the encryption operations implemented to encrypt the ballot lot number and/or the random number.

In embodiments, the counting of votes system includes a means for writing into the memory of the electronic label associated with the voting ballot, information representative of counting, by the vote counting system, the vote borne by the ballot.

Since the particular advantages, purposes and characteristics of this electronic label and counting of votes system are similar to those of the method object of the invention, they are not recalled here.

BRIEF DESCRIPTION OF THE FIGURES

Further particular advantages, purposes and characteristics of the invention will become clearer from the non-limiting description that follows of at least one particular embodiment of the device and method object of the present invention, with regard to the attached drawings, wherein.

DESCRIPTION OF THE EMBODIMENTS

This description is provided for non-limiting purposes, wherein each characteristic of an embodiment can be advantageously combined with any other characteristic of any other embodiment.

From now on, it is noted that the figures are not drawn to scale.

In the remainder of the description, each possible choice that a voter may make is called a "candidate", by analogy with elections of persons, even if the present invention applies equally to this type of election, to a referendum or to votes. Voting ballots are physical voting ballots, that is they are handled by hand and physically introduced into the ballot box.

First Embodiment

Figure 1:
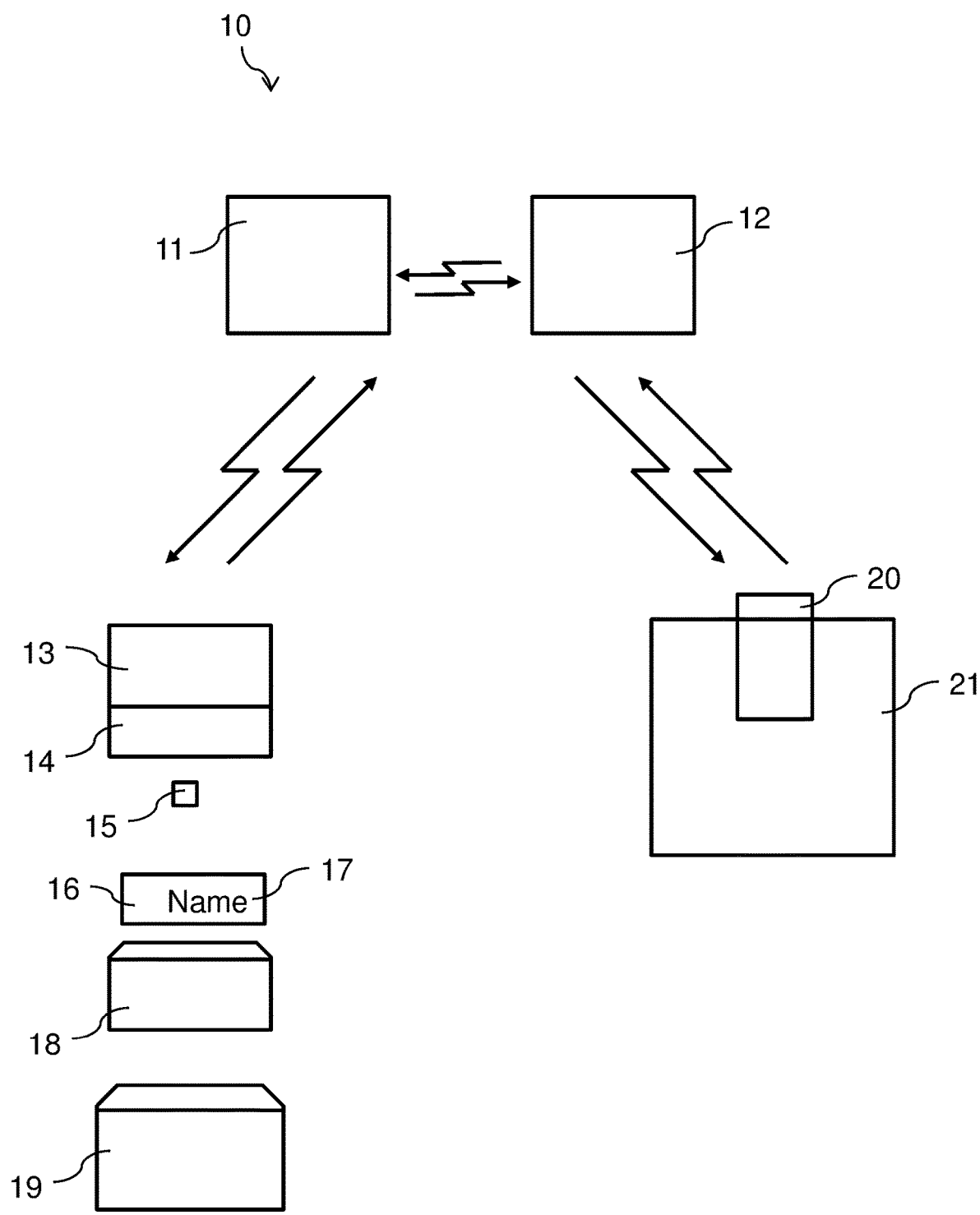
FIG. 1 schematically represents a first embodiment of the postal voting device object of the invention.

FIG. 1 shows a postal voting device 10, which includes an authentication server 11, a validation server 12 and a counting of votes system 20 associated with a ballot box 21. A user terminal communicating 13 including an electronic label reader 14 15 allows the user to connect with the servers 11 and 12. The electronic label 15 is of a known type, for example near field, operating according to the RFID protocol (acronym for Radiofrequency Identification) or NFC (acronym for Near Field Communication).

At least one ballot 16 bearing a choice 17 that the user may make in the election, a voting envelope 18 and a transport envelope 19 are available to the user.

Servers 11 and 12 are accessible online, on the Web. They communicate with the user terminal 13 via the Internet. The validation server 12 communicates with the counting system 20 either via the Internet, or by file transfer on a physical medium, called a "voting ballot", for example transported by a postal service. Servers 11 and 12 may constitute a single server but, preferably, they are separated to better guarantee confidentiality and anonymity of the vote.

The user terminal 13 is, for example, a computer, a mobile phone or a tablet, where a software or a postal voting application has been installed.

The counting of votes system 20 may be used for signing and/or introduction of voting ballots in the ballot box 21.

The envelope 18 is anonymous and configured to contain, out of sight, a voting ballot 16. The envelope 19 allows postal transport from envelope 18 to the voting place.

In embodiments, the electronic label 15 is secured to a voting ballot 16 before being delivered to the user. In this case, the user receives at least two voting ballots, each bearing an electronic label 15 and a different candidate name 17.

In embodiments, the electronic label 15 is independent of any voting ballot 16 when delivered to the user with at least two voting ballots 16 each bearing a different candidate name 17. The user must then stick the electronic label on a voting ballot 16, the envelope 18 or the envelope 19, according to the instructions given.

Figure 2:
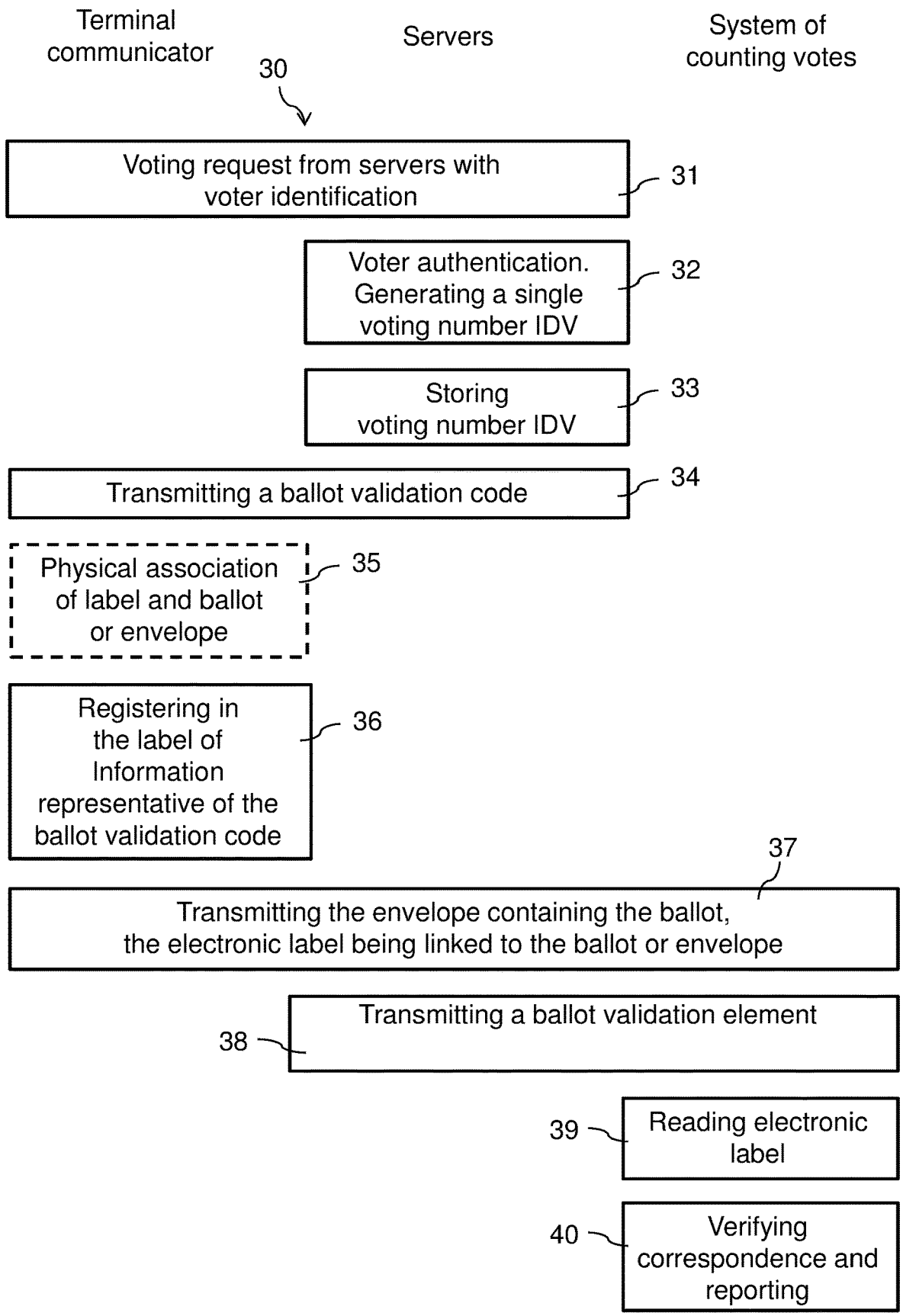
FIG. 2 represents, in the form of steps performed by different physical means, in a first embodiment of the method object of the invention.
Figure 3:
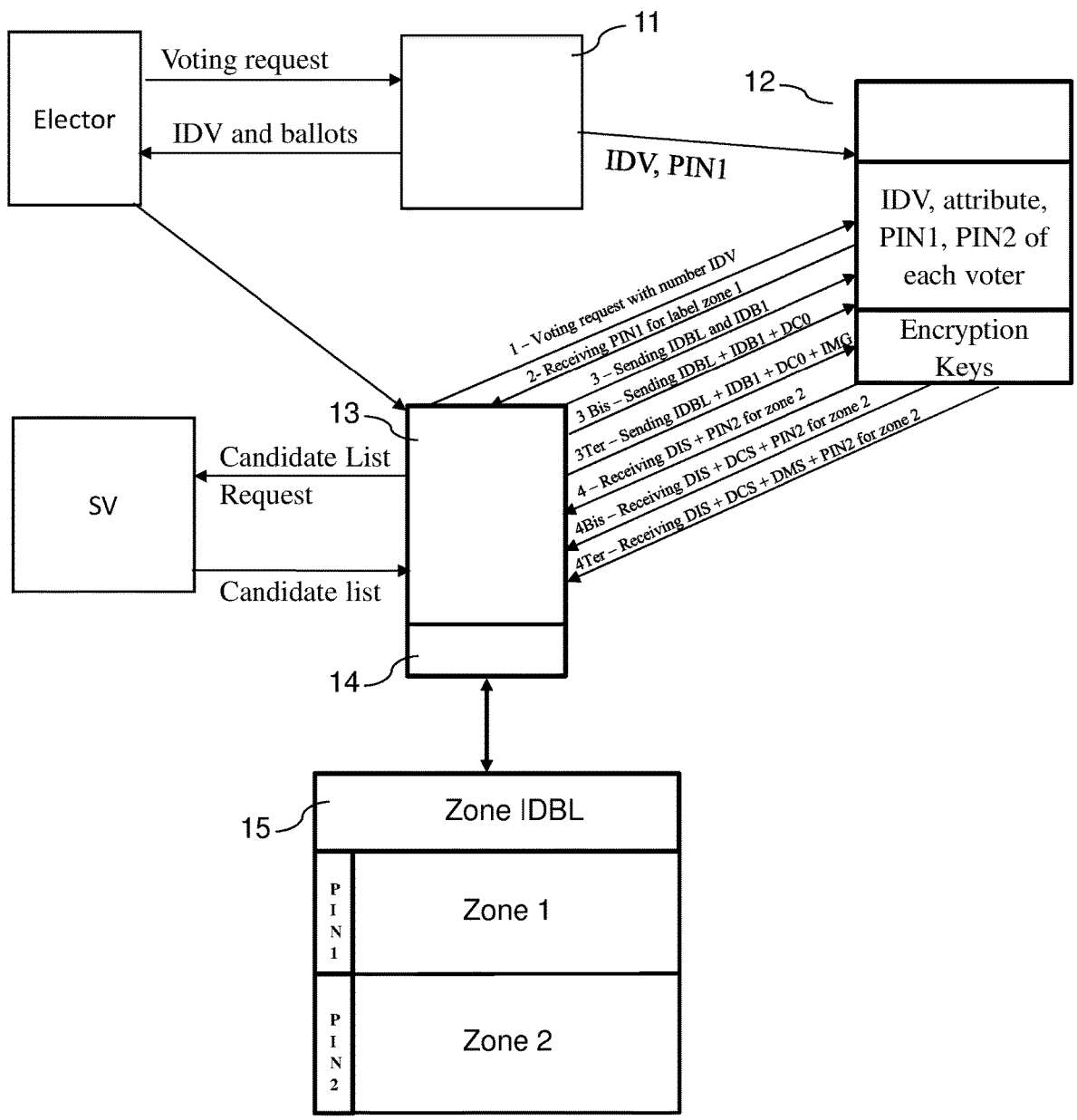
FIG. 3 represents, in the form of data transmissions, a second embodiment of the method object of the invention.

In FIG. 2, the steps of a particular embodiment of the postal voting method 30 are observed.

FIG. 2 shows a sequence of 30 steps carried out by the communicating terminal 13, on the left, by the servers 11 and 12, in the centre, and by the counting of votes system 20, on the right.

When a step is performed by exchange between two entities, the step overlaps the columns corresponding to these two entities, except step 37 which does not concern the servers.

In a step 31, the user logs on to the authentication server 11 to request a postal vote, by connecting a user terminal 13 to a first server 11. It is noted that, in step 31, it is not necessary for the voting software or application to be installed on the user terminal 13. This software or application may possibly be installed on the user terminal 13 during one of the steps 31 to 34.

In a step 32, the authentication server 11 performs authentication of the user of the terminal 13, for example by uploading a photo (or "scan") of at least one identity document and/or proof of address or by biometric recognition. If authentication is positive, the authentication server generates a single voting number IDV for the user.

In other words, if the user logs in and authenticates a second time, no new voting number is assigned thereto. The voting number IDV is anonymous. For example, the voting number is an incremental number.

In a step 33, the validation server 12 performs storing of the user's anonymous number IDV.

The user performs a voting step. The server then performs a step of verifying that this is the first step in the user voting.

If this is the first voting step carried out, for the current polls, by the user, in a step 34, the validation server 12 transmits a physical ballot validation code to the user terminal. This validation code may be unique to all user terminals or to all users with the same voting place, in which case a sign-off procedure is necessary since it is necessary to prohibit a same user from validating two voting ballots. For example, the envelope 19 identifies the user who voted and, before placing the voting envelope 18 in the ballot box, the voting place verifies that no vote has previously been performed (in person or by correspondence) by the identified user. Preferably, the validation code is different for all users. For example, it is an encryption, with a key assigned to the validation server 12, of a ballot lot number, a random number, the voting number IDV and/or the time of transmission of the ballot validation code to the user terminal.

In an optional step 35, which corresponds to the case where the user only has one electronic label 15, and which can be carried out before or after step 34 or step 36, the user carries out the physical association of the electronic label 15 with the physical ballot 16, with the envelope 18 or with the envelope 19, according to the instructions sent to them.

In a step 36, the user terminal 13 implements the reader 14 of the electronic label 15 to enter in the electronic label 15 information representative of the validation code of the physical ballot. This information may be the ballot validation code received from the validation server 12 or a coding/encryption of this ballot validation code, in which case the counting system 20 should have the coding/encryption or decoding/decryption key to verify validity of the voting ballot. If necessary, in the event that an electronic label 15 is included in a voting ballot, the memory of the electronic label may retain the name of the candidate bearing the voting ballot. If the user only has one electronic label 15 for several ballots, the user terminal 13 may implement the reader 14 of electronic labels 15 to register the name of the candidate bearing the voting ballot 16 into the memory of the electronic label 15. A procedure for verifying correspondence between the legible name of the candidate and the name of the candidate registered in the memory of the electronic label 15 is then preferred. Such a procedure is described later.

In a step 37, the user sends to the voting place the envelope 19 containing the envelope 18 containing the voting ballot 16, for example by post.

During a step 38, preferably on the last day of the vote, the validation server 12 transmits to the counting of votes system 20, distinct from the validation server 12, a physical ballot validation element, for example a coding/encryption key or decoding/decryption of information representative of a validation code registered in an electronic label 15. The ballot validation element may also include the ballot validation code, a timestamp, or a random sequence that was used to generate the information representative of the validation code written into the memory of the electronic label 15.

During a step 39, the counting of votes system 20 reads the information representative of the physical ballot validation code from the memory of the electronic label 15.

During a step 40, the counting of votes system 20 verifies, for each voting ballot received, correspondence between:
the information representative of the ballot validation code and
the validation element or one of the validation elements received.

In the event of correspondence, the envelope 18 containing the physical voting ballot 16 is taken into account, that is validated and introduced into the ballot box 21.

The voting ballots 16 are then reported conventionally, by visual reading of the names of candidates borne by the voting ballots and/or by electronic reading of the names of candidates retained in the memories of the electronic labels 15 borne by the voting ballots. For example, the reporting implements the description of one of documents FR20100000868 and FR2977698.

As can be understood from reading the description of the first embodiment, the postal voting method 30 includes:
a step 31 of connecting a user terminal 13 to a first server 11,
a step 32 of authenticating the user of the user terminal 13 by the first server 11, and associating a single voting number to the user,
a step 33 of storing by a second server 12, the user's voting number,
a step 34 of transmitting, by the second server 12 to the user terminal 13, a ballot validation code 16,
a step 36 of registering, by the user terminal 13 in an electronic label 15, information representative of the ballot validation code 16,
a step 38 of transmitting, by the second server 12 to a counting of votes system 20, a ballot validation element 16,
by the counting of votes system 20, for each voting ballot 16 associated with an electronic label 15, a step 39 of reading the information representative of the validation code in the electronic label 15 and a step 40 of verifying correspondence between the information representative of the validation code read and the validation element received by the counting system 20 and, only if this verification is positive, a step of taking account of the ballot 16 associated with the electronic label 15.

It is noted that the correspondence verification can be performed by data decryption, having at least one decryption key or by encryption, reproducing each encryption performed on the data and comparing the result with the encrypted data read in the memory of the electronic label 15.

More particularly, as set forth below with respect to the second embodiment:

In embodiments, in the step 34 of transmitting, from the second server 12 to the user terminal 13, a ballot validation code, the user terminal transmits to the second server 12 a ballot lot number and/or a random number, the second server encrypts each number received from the user terminal and returns it encrypted to the user terminal.

In embodiments, in step 34 of transmitting, by the second server 12 to the user terminal 13, a ballot validation code, the user terminal encrypts an identification of the choice of the user from the possible choices during the election, with, as encryption key, a ballot lot number and/or a random number, and transmits the encrypted choice identification to the second server 12, the second server encrypting this encrypted choice identification and returning it encrypted to the user terminal.

In embodiments, the method includes, after the step 32 of authenticating the user of the user terminal 13 by the first server 11, a step of transmitting to the user a plurality of voting ballots 16, visibly and legibly bearing a possible choice 17 during the election, each voting ballot being physically linked to an electronic label 15 retaining, in memory, the identification of the choice made by the voting ballot.

In embodiments, the identification of choice 17 borne by the ballot 13 is retained encrypted in the memory of the electronic label 15.

In embodiments, the method includes a step of transmitting, to the user, a first code PIN1 for accessing the content of a first part of the memory of each electronic label 15 received by the user, this first part retaining a vote identifier and/or an identification of the choice 17 made by the user during the election.

In embodiments, the method includes a step of modifying, by the user terminal, the first code PIN1 together with the step 36 of registering, by the user terminal in an electronic label 15, information representative of the ballot validation code.

In embodiments, the method includes a step of transmitting, by the second server 12 to the user terminal 13, a second code PIN2 for accessing the content of a second part of the memory of each electronic label 15 received by the user, this second part retaining the information representative of the ballot validation code.

In embodiments, the method includes a step of registering, into memory of each electronic label 15 received by the user, a ballot lot number 16 common to the electronic labels of several users.

In embodiments, the method includes a step of sticking an electronic label 15 to a ballot 16 bearing an identification 17 visible and legible to the eye of the choice made by the user from the possible choices during the election, a step of capturing an image of the ballot bearing the stuck electronic label, a step of encrypting this image and a step of storing the electronic label of this encrypted image together with step 36 of registering, by the user terminal in an electronic label 15, information representative of the ballot validation code.

In embodiments, the method includes a step of optical character recognition of the identification of the choice made by the user from the possible choices during the election supported by the ballot 16 to which the electronic label 15 is stuck and a step of registration, by the user terminal in the memory of the electronic label 15, of information representative of the identification read by optical character recognition.

In embodiments, the method includes a step of sticking an electronic label 15 to an envelope 18, 19 containing the ballot 16 bearing an identification 17 visible and legible to the eye of the choice made by the user from the possible choices during the election.

In embodiments, the method includes a step 37 of transmitting, by the user to a voting place, a voting ballot associated with an electronic label, in an envelope forming a Faraday cage.

Second Embodiment

For additional security, with respect to the first embodiment, a personal identification number (PIN) is provided to access the content of at least a part of the memory of the electronic label 15.

Preferably, a non-unique number is also implemented, that is implemented by several users such as a ballot lot number IDBL (non-unique number generated when the ballot was manufactured) and a number generated by the software or the voting application, for example randomly.

The ballot is marked as validated by entering a validation code transmitted by the validation server 12 in response to transmitting, by the user terminal 13, this number or its signature.

During reporting, to verify validity of the voting ballot, the counting of votes system 20 reads, in the electronic label 15, the non-unique number IDBL and the number IDB1 generated by the voting software or application to deduce the DIS validation code given by the server.

The non-unique number guarantees anonymity when the voting ballots are sent, as they cannot be attached to a voter.

The second embodiment is described below.

The user, also known as voter, receives or withdraws the "digital paper" ballots 16 of a plurality of possible choices for the polls concerned, each voting ballot 16 having an integrated electronic label 15 and bearing a visible mention 17 of a single candidate.

Each electronic label 15 stores in its memory the name of the encrypted candidate corresponding to the name of the legible candidate 17 written on the paper ballot 13.

In the second embodiment, the device mainly includes:
- the server 11 to which requests are addressed and which randomly generates identification codes ("PIN code") and a personal voting number IDV for the voter. Each voter must request, via a user terminal, at least two voting ballots, the server 11 storing their request and sending them, for example by post, the non-activated voting ballots requested.
- the server 12 on which the encryption data (keys, code PIN2 and voting number IDV) are stored for each election (each municipality, for example, and/or each voting place).
- the reader 14 of electronic labels 15 connected or integrated into the user terminal 13 of the voter.

the voting software or the voting application installed on this user terminal 13.

voting ballots 16 each provided with an electronic label 15 having secure access and/or single writing memory zones available.

a secure sending envelope 19 with Faraday cage to avoid any attempt to destroy the electronic label 15 of the activated voting ballot 16 bearing the name of the candidate chosen by the voter when voting.

the counting of votes system 20 including a system for the identification of voters and secure signing, listing the surnames and first names of all voters who voted, a system which guarantees secrecy of the vote and the automatic envelope reporting system, also called "ballot box" 21.

In this second embodiment, the voter identifies themselves and, optionally, identifies their voting place, with server 11 and sends it a request for a postal vote. After verifying the voter's identity, a unique personal voting number IDV is generated, for example randomly, by server 11 and sent to encryption server 12.

The voter shall receive, or withdraw from an authority, the voting ballots 16 already printed on the candidates' names, each voting ballot retaining, in the memory of its electronic label 15, an identifier of the candidate corresponding to the legible name 17 of the candidate printed on the ballot 16. Each ballot 16 is then inactivated, that is if it was read by the counting system 21, it would consider it invalid and would not take it into account.

The voter receives, for example, by e-mail, short message ("SMS") and/or by post, their voting number IDV or part thereof, the other party being sent to them by another transmission means, for example with voting ballots 16 if sent to them by post. This voting number IDV allows the voter to activate, via the encryption server 12, one and a single ballot 16 and to secure their vote.

The electronic label 15 of each voting ballot 16 shall also retain in its memory a non-unique number, for example a lot number IDBL, the code of the municipality where the voter is authorised to vote and/or the national number of the voter's voting place.

The electronic label 15 also includes a memory space for a number IDB1 generated by the user terminal 13, for example randomly, a number which will be sent to the server 12 which retains the encryption keys per voting place for example. These keys are generated by the election organiser before the opening of the postal vote for each voting place for example KIE only (single mode) and KDE for election with candidate identified in the electronic label.

These encryption keys will be sent to the counting of votes systems 20 after the postal vote is closed.

The voting ballots 16 are produced with, in the case of voting ballot 16 with only one validation zone, the lot number IDBL and, possibly, the voting place number and an election identifier and, to access an identification zone, the lot number IDBL and, to access an applicant identification zone, the personal access code PIN1.

The voting ballots 16 are produced with, in the case of a voting ballot 16 with the validation zone and a candidate's accounting zone, the lot number IDBL and, possibly, the voting place number and an election identifier and, to access the identification zone and the candidate's accounting zone, the lot number IDBL and the personal access code PIN1.

The voting ballots 16 are produced with in memory, in the case of a voting ballot with the validation zone, the candidate's accounting zone and a zone for review by the terminal 13, the lot number IDBL and, possibly, the voting place number and an election identifier and, to access the identification zone and the candidate's accounting zone, the lot number IDBL and the personal access code PIN1 and, to access the review zone, the lot number IDBL and a personal access code PIN2.

Once encoded and sent, the number IDV is deleted from the request server 11.

The data on the electronic label 15 of the ballots 16 sent are encrypted and/or accessible by personal code PIN1. This personal code PIN1 is identical for all voting ballots 16 of the same voter before being replaced at the time of validation. The code PIN2 is not linked to the voter and is linked to the election and place number.

At the server 12, the voting number IDV and an attribute indicating that a voting ballot has been validated by this voter, as well as the code PIN1, the election number, the voting place number and, for the vote, the voting number, the voting place number, encryption keys KIE and KDE and the code PIN2 that will be sent to the counting of votes system 20, are retained in memory. PIN2 is sent to the terminal 13 to access the voting zone of the electronic label 15.

The data stored in the memory of the electronic label 15 of the voting ballots 16 for controlling and counting the vote are, for example, identical to those of the "digital paper" ballots produced during the face-to-face vote on a ballot box, for example, the subject matter of one of the documents FR20100000868 and FR2977698.

The memory of the electronic label 15 of each ballot 16 activated retains at least the following first two sets of data:

a set of data for controlling validity of the ballot, which is calculated and encrypted by the encryption server, a set of data representative of the vote made by the voter, that is the choice of a candidate, which is used to count the vote at the time of reporting. These data used for counting the vote are encrypted with the key KDE stored on the server 12 and sent as the key KIE and PIN2 to the relevant counting of votes system 20.

The keys KIE, KDE and PIN2 are generated by the election organiser before the postal vote opens. PIN1 is generated when the voter requests an associated IDV.

In this second embodiment, after receiving or withdrawing the voting ballots and the voting number IDV:

the voter launches the voting software or application on their user terminal 13 and accesses the encryption server 12.

the voter enters the voting number IDV sent to them. As set out above, the valid voting number IDV may need to be reconstituted from two separately received parts.

the voter places the voting ballot 16 legibly bearing the name of the candidate 17 of their choice on the reader 14 of electronic labels 15 of the user terminal 13.

the voting software or application detects the presence of the electronic label 15 on the reader 14 of electronic labels.

the voting software or application sends an identification request with the personal voting number IDV to the encryption server 12.

Once the voter has chosen and the candidate's voting ballot 16 has been placed on the reader 14 of electronic labels 15, the voting software or application requests the encryption server 12 to activate the voting ballot 16, a request that does not include identification of the candidate chosen. This activation includes the following steps:

the voting software or application reads the lot number IDBL from the electronic label.

the voting software or application generates a new random number IDB1.

the voting software or application sends IDBL and IDB1 to the encryption server 12. The lot number allows the encryption server 12 to know the election code.

Then IDBL and IDB1 (or their CRC signature for example) are encrypted with the key KIE of the encryption server 12 corresponding to the election code. The result of this encryption is DIS. The code PIN2 (voting PIN) corresponding to this election is read from the encryption server 12. DIS and the code PIN2 are sent to the voting software or application. The code PIN2 allows this software or application to access the voting validation/identification zone and stores IDB1 and the voting validation number DIS therein.

The ballot is then validated.

The encryption server 12 marks, in its memory, the voting number IDV as corresponding to an "activated ballot". No further voting ballot 16 of this voter can be activated for this election.

The voter puts voting ballot 16 in a voting envelope 18 and the voting envelope 18 in the secure sending envelope 19 (follow-up mail for example) and returns it to a postal voting centre or to their municipality (for example) and their voting place. It is noted that the secure sending envelope 19 identifies the voter, that is bears their name.

On the day of the face-to-face election, the voter's name borne on the secure sending envelope 19 shall be signed by the chairman of the voting place. The chairman then opens this secure sending envelope 19, extracts the voting envelope 18 from it and inserts it into ballot box 21, which everyone can see.

The voting envelope 18 is identical to the face-to-face voting envelopes of the voting place. On the day of the election, the counting of votes system 20, for example the ballot box, receives from server 12 the key KIE (corresponding to the voting place, for example) and reads the values IDBL and IDB1 in the memory of the electronic label 15 of each voting ballot 16. Then, the counting of votes system 20 encrypts "IDBL+IDB1" with the key KIE, which gives DIS (ballot box). Finally, the counting of votes system 20 reads, in memory of the electronic label 15, the DIS value entered in it by the user terminal 13 and compares it with DIS (ballot box).

If these values are equal, the vote is counted (with the figures and the KIE and keys KDE corresponding to the voting place, for example).

This operation with envelopes 19 received may be carried out at any time during the voting day. In particular, it may be carried out at the end of the face-to-face voting, which allows a voter who voted by correspondence to vote in person if they have changed their opinion and/or choice of candidate. In this case, before introducing a postal voting envelope 18, the Chairman and an accessor must ensure that the attendance register has not already been signed for the voter's name borne on the secure sending envelope 19. If an endorsement has already been made, the envelope 19 is destroyed.

At the end of the ballot, the electronic ballot box 21 displays the results including face-to-face and postal ballots. It is impossible to differentiate between them, which guarantees secrecy of the vote.

Alternative of the Second Embodiment—Mass Reporting

The postal voting envelopes may also be sent to a national or regional counting centre for reporting in order to be reported there. Voices can be counted automatically by inserting the stacks of envelopes into the mass reader LEC1. This reader contains the keys of the KIE and KDE of the municipalities and/or voting places of the voting ballots to be reported.

Alternative of the Second Embodiment—Verification of Postal Votes

At any time, the voter can verify, using the tracking number, routing of their secure sending envelope 19.

Statistics may be made for each national voting place number, of the number of "validated" voting ballots with the number of voting ballots (envelope) received and counted in the voting places.

At any time, a voter may go to a voting place and ask to verify the content of the secure sending envelope 19 sealed by them.

They can carry out a visual check by opening their secure sending envelope 19. They can also review the content of the electronic label 15 only with the user terminal which registered there thanks to its unique key stored therein.

Encryption Operations and Servers:

All encryption operations are done using algorithms guaranteed by ANSSI (Agence nationale de la sécurité des systèmes d'information) for example, such as AES128, and are all signed in SHA-256, for example.

The request server 11 verifies and generates the codes IDV and PIN1, sends them to the server 12 while triggering the voting ballots 16 requested by the voter to be sent. Server 11 does not retain these numbers.

Optionally, a candidate server SV (not represented) that retains the list of possible choices for the current election can be accessed without a voting number IDV. It is read-only and isolated from servers 11 and 12.

The encryption server 12 does not store any candidate data. It cannot send data to the server 11.

The data to be reported are on the voting ballot 16 validated by the voter.

The reconstitution of the vote is carried out using the data read in the memory of the electronic label 15 of each voting ballot 16 in the voting place or in a postal voting counting centre. Once the encryption data as well as the postal voting requests are stored therein, the server 12 switches to read-only. Only the update zone corresponding to the voting number can be modified and only for the replacement of the "inactivated ballot" attribute by the "activated ballot" attribute. The memory of the server 12 can be calibrated in relation to the number of voting places, keys and votes, in order to ensure that no voting and/or voting validation data could be stored therein. This calibration can be electronic (for example memory capacity limitation). When closing the postal vote, the data corresponding to the voting requests are destroyed: no postal voting is then possible. Only encryption keys remain stored. Statistical data such as the number of voters and/or postal voting requests per place can be calculated and stored before the requests are deleted. On the day of the vote, once the keys have been sent to the voting places or to a reporting centre, these keys may be destroyed.

Signatures Before Encryption Operations:

All encrypted data like DIS, DCS and DMS can be encrypted with the signature of the zones that allow to encrypt them as IDA1 and IDBL for DIS. Preferably, the result of the signature, polynomial CRC for example, is sent to the server for encryption, rather than IDA1 and IDBL.

This method makes it possible to have several identical encryption operations and thus make it impossible to identify a voter for a vote.

The more identical signatures can be obtained using the CRC calculation method, the more secure the anonymity is. This additional security allows responding to postal vote detractors who believe servers store data that can be traced back to a voter.

Case of Use of a Single Electronic Label 15 Per Voter:

The voter logs on to server 11 and requests a postal vote. After verifying their identity, a voting number IDV and a code PIN1 are generated randomly by the server 11 and sent to the encryption server 12. The voter receives a single pressure-adhesive blank electronic label 15 and paper ballots 16 identical to those used in person on the day of the vote, with candidate data 17 printed in unencrypted way. The voter may also print out the voting ballot 16 of the candidate they wish to choose. The blank electronic voting data label 15 contains only a non-unique number IDBL (for example lot n°), the municipality code (for example) and/or a national voting place number. These numbers are encoded in the blank electronic label 15 by the municipality (for example) before sending this electronic label 15 and paper voting ballots 16 if the voter cannot print them and they have requested them.

To vote, the voter chooses the paper voting ballot 16 of their candidate and then sticks the blank electronic label 15 on the ballot 16 chosen. The blank electronic label 15 and the paper ballot 16 chosen can no longer be separated without destruction.

The voter uses their user terminal 13 equipped with an electronic label reader 14. The voter launches the voting software or the voting application. The voter enters or scans and/or photographs the information of the selected candidate directly in the application and written on the paper ballot stuck on the blank electronic label. Graphical information is transformed into alphanumeric data (through optical character recognition "OCR" and image signature "IMG"). Using the election code, municipality (for example) and/or voting place number, the application connects to the candidate server SV and requests the list of all candidates.

The user terminal 13 can locally verify in this list the presence of the candidate chosen by the voter and validate their choice.

Alphanumeric data and graphic information and/or their signatures may be stored in a dedicated zone of the electronic label 15.

The voter places their voting ballot 16 on the reader 14 of electronic labels 15.

The application detects the presence of the electronic label 15 on the reader 14.

The application reads the municipality code and/or the voting place number of the voter (on six digits for example) from the electronic label 15 and/or directly from the server with the voting number IDV.

The application reads the lot number IDBL and generates three random numbers IDBT, IDB1 and IDB2.

The application encrypts the candidate data directly on terminal 13 with the key KBT made up of IDBL and IDTA, which gives DCT. These data can also be encrypted directly in the electronic label 15 of the ballot 16 (in 3DES for example). Using the code PIN1, these DCT encrypted data are stored in the "replay" candidate memory zone of the electronic label.

The application performs a first encryption on the terminal 13 of the candidate data entered or scanned with the key KB2 made up of IDBL and IDB2, which encryption gives DC0. These data can also be encrypted by the electronic label 15 (in 3DES for example).

The application generates a code PIN1. Using the code PIN1, the encrypted data DCT are stored in the "replay" candidate memory zone of the electronic label 15.

The application sends IDBL, IDB1, IMG and DC0 previously encrypted to the encryption server 12. The election code (the municipality code, for example, and/or voting place number) is also sent and/or read directly from the server.

Then IDB1 and IDBL are encrypted with the key KIE of the server 12 which corresponds to the election (the municipality and/or the voting place number). The result of this encryption is DIS.

The data DC0 are encrypted with the key KDE of the server 12 which corresponds to the election. The result of this encryption is DCS.

The data IMG are encrypted with the key KDE of the server 12. The result of this encryption is DMS.

Figure 4:
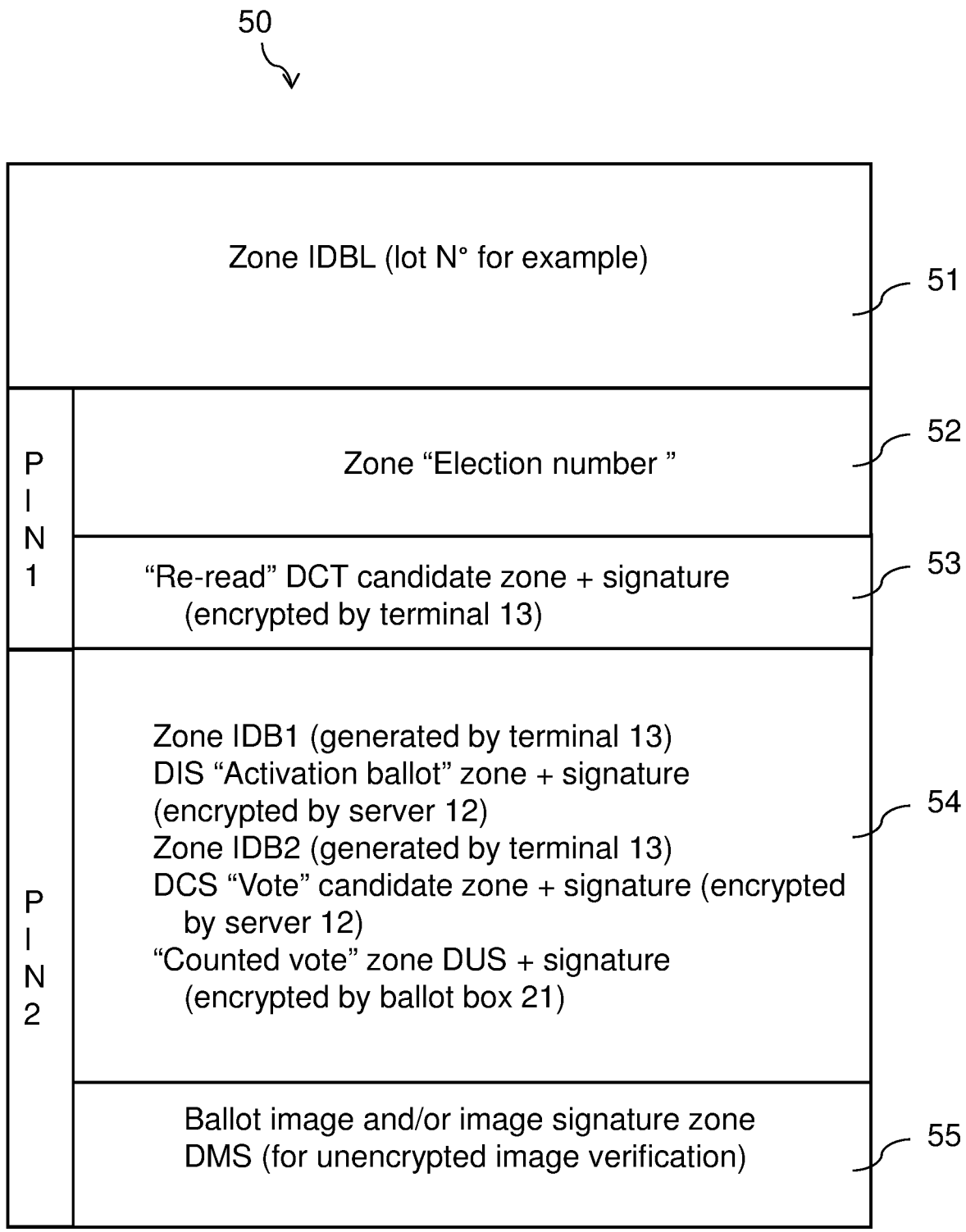
FIG. 4 represents different zones of an electronic label memory implemented in the second embodiment of the method object of the invention.

The code PIN2 corresponding to this election is read from the server. DIS, DCS and the code PIN2 are sent to the user terminal 13. The code PIN2 gives access to the voting zone of the electronic label 15 and stores DIS, IDB1 and IDB2, DCS therein. The ballot 16 is then validated with the voting validation number DIS and retains the encrypted candidate data DCS. The encryption server 12 stores the voting number IDV as corresponding to an "activated voting ballot". Architecture of the memory of an electronic label:

As illustrated in FIG. 4, a memory 50 of an electronic label 15, for example of RFSID type (acronym for "Radio Frequency Same IDentification") implemented in the second embodiment includes:

- a zone 51 for retaining the lot number, which number is common with other ballots 16 to promote anonymity,
- an election data retention zone 52,
- a zone 53 for reviewing the candidate's name, only accessible to the voter,
- a zone 54 for retaining information representative of a validation code, meaning that the voting ballot is activated, used for verification before counting, of a candidate name corresponding to the name of the candidate printed on the voting ballot, for counting by the ballot box, and for retaining information indicating that the voting ballot has been counted, entered per ballot box and
- a zone 55 for retaining a ballot image or an image signature.

Thus, according to a second aspect, the present invention is directed to an electronic label for postal voting by association with a voting ballot, which includes a memory including information representative of a voting ballot validation code.

More particularly:

- In embodiments, the information representative of a ballot validation code includes, in an encrypted manner, a ballot lot number and/or a random number.
- In embodiments, the information representative of a ballot validation code includes, encrypted by a ballot lot number and/or a random number, then by a remote server, an identification of the user's choice from the possible choices during the election.
- In embodiments, the memory further includes an image of a voting ballot on which this electronic label is stuck.
- In embodiments, the memory further includes information representative of the recognition, by a ballot box, of the vote borne by the voting ballot.

Ballot Architecture:

Lot N° zone corresponding to the identical serial number (Patent reminder "non-unique number"). This zone is initialised when the ballot is produced with a non-unique number. This number is identical for a lot of ballots (for example identical for a roll of 1000 ballots).

1: Marking Only

"Election data" zone initialised when printing the voting ballot with the election n°, voting place n° (accessible or not by code PIN1) and/or with when validating the ballot. These data are used to verify the ballot before its validation.

"Validated ballot" zone for verification before counting (accessible by PIN1).

"Booked ballot" zone (which (could be the "validated ballot" zone updated to "counted ballot") marked by ballot box as counted (accessible by PIN2).

2: with Secure Review on User Terminal 13

"Replay candidate" zone only possible by the voter (accessible by PIN1). Alternatively, this zone allows verifying that the voting ballot has been validated by the voter's user terminal 13, only this terminal can read it.

3: with Name and/or Candidate Code for Automatic Reporting

"Voting candidate" zone for counting by ballot box or else (accessible by PIN2).

4: Image "Ballot Image" or Image Signature Zone (Accessible by PIN2).

PIN1 is linked to the voter and is identical for all voting ballots of a voter. It will be modified by the application and stored in the memory of the user terminal.

PIN1 is linked to the voter and PIN2 is linked to the election and/or a voting place number.

Redundancy, for example a cyclic redundancy code ("CRC"), is used to verify data integrity.

All these zones 51 to 55 can be accessed by PIN and/or are encrypted.

Figure 5:
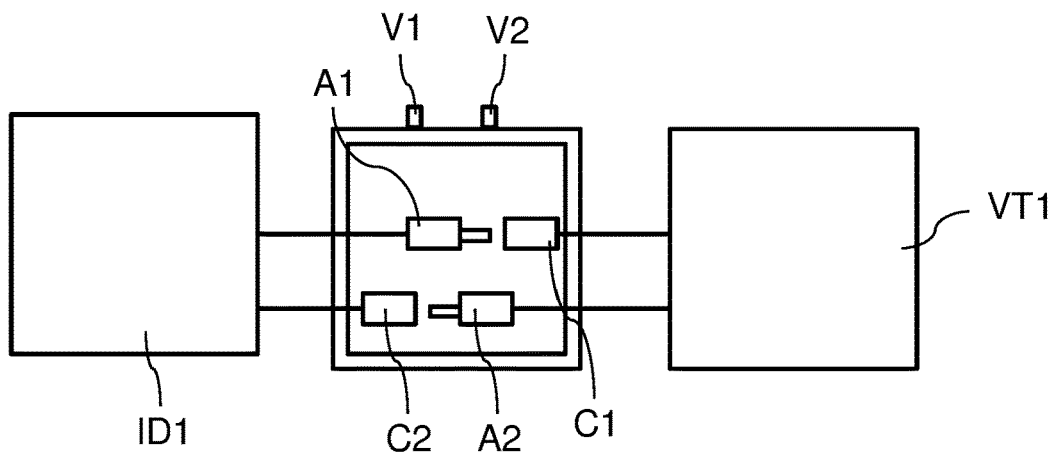
FIG. 5 represents an automatic ballot box.
Figure 6:
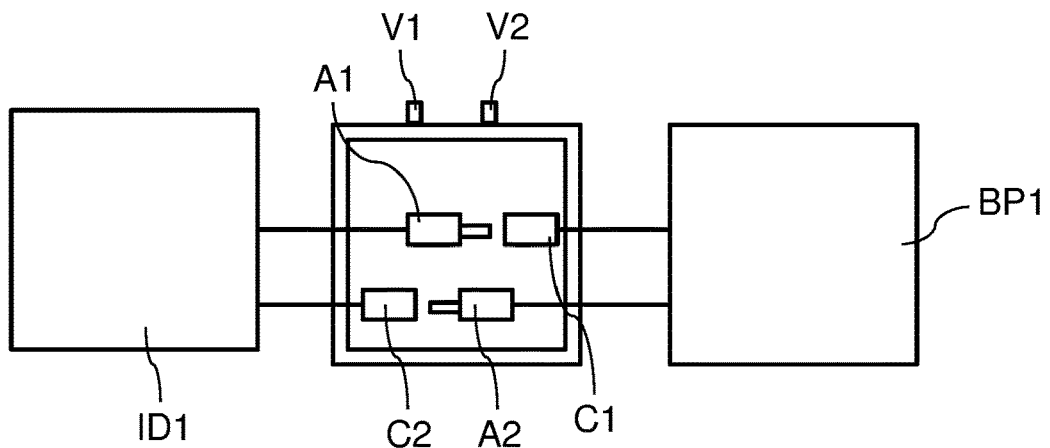
FIG. 6 represents a production of voting ballots.
Figure 7:
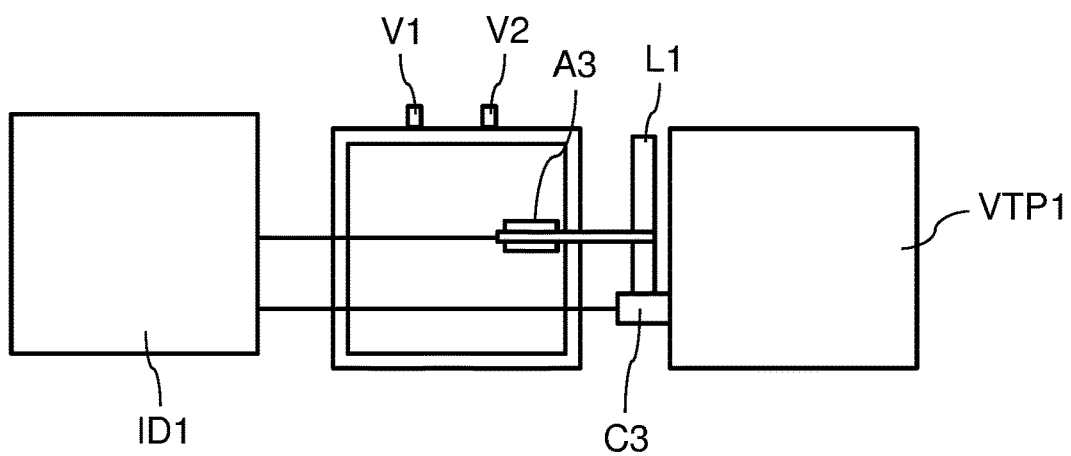
FIG. 7 represents means for voting with a conventional ballot box equipped with a mechanical unlocking of the ballot box hatch lever.

Identification and Signing System (FIGS. 5 to 7)

In order to facilitate the identification and signing of a voter during voting, an electronic identification system such as a memory card (contact or contactless), a PIN or similar is preferably used. The drawback of such systems is that the secret of voting may not be respected. Indeed, if one can link a voter to the candidate they have chosen, the secret of the vote would not be respected. The invention makes it possible to identify a voter independently of the voting system (electronic and/or digital and/or paper) while allowing the voting to be activated. An electronic identification system ID1 linked to a database to identify the voter and an electromechanical system RD1 controlled by ID1 to activate the voting system mechanically (no electronic and/or computer link). After validation by ID1, the system RD1 activates a push button, for example, which then authorises voting. The device is also electro-mechanically activated by the voting system VT1 in order to validate the vote by activating for acknowledgement a second push button, for example, linked to the identification system ID1. The system RD1 is encapsulated in a secure and fully transparent box so that the voter can see mechanical actions. Two indicators linked with each mechanical action allow to view the sense («Voting request» and "Vote cast"). The device may be connected to an electronic voting system, to the ballot box and/or the "digital paper voting" system terminal and/or to a paper ballot box. In all cases, the device activates them mechanically.

The elements of the electronic signing system include:
an electronic unit for identifying a voter,
a voter's identification card (smart card, for example),
a secure transparent casing (for example of Plexiglass, registered trademark),
an electronically controlled electro-mechanical actuator A1 coded to activate a vote,
an electrical contact C1 for sending an electrical signal coded to the terminal or the ballot box to activate the vote,
an electronically controlled electro-mechanical actuator A2 coded to acknowledge the vote,
an electrical contact C2 for sending an electrical signal coded to acknowledge the vote to the identification system,
an indicator for displaying activation of a vote V1,
an indicator for viewing validation of a vote V2.

This actuator A1 activates an electric contact button C1 for sending a coded electric signal to the terminal or to the ballot box. This actuator A2 controls an electronically controlled electro-mechanical actuator coded to acknowledge a vote by activating the electrical contact C2 that sends a coded electrical signal to the electronic identification system.

In the case of the traditional paper ballot box, the coded actuator A1 releases the hatch opening lever.

The electrical contact C2 is integrated into the mechanical lever of the ballot box and connected to the electronic identification system which receives the coded signal to acknowledge the vote.

In FIG. 5, an electronic unit ID1 for identifying a voter and activating an actuator coded A1, which actuates an electrical contact coded C1 connected to and decoded by a ballot box VT1 and switches on the indicator V1 is observed. After introduction of an envelope in the ballot box VT1, VT1 activates a coded actuator A2, which actuates the coded electrical contact C2 connected and decoded by the identification system ID1, and thus acknowledges the vote. The indicator V2 indicating "vote cast" is then switched on for a few seconds. All mechanical activation or validation actions are visible but inaccessible.

In FIG. 6, a production of paper ballots with electronic labels is observed. An electronic unit ID1 for identifying a voter and activating the coded actuator A1, which actuates the coded electrical contact C1 connected and decoded by terminal BP1. The indicator V1 is then switched on. After production of the ballot, terminal BP1 activates the coded actuator A2, which actuates the coded electrical contact C2 connected and decoded by the identification system ID1, and thus acknowledges the request to produce the ballot. The indicator V2 indicating "vote cast" is then switched on for a few seconds. All mechanical activation or validation actions are visible but inaccessible.

In FIG. 7, a vote with a ballot box for traditional paper voting ballots and with a mechanical unlocking of a lever on a ballot box hatch is observed.

An electronic unit ID1 for identifying a voter and activating the coded actuator A3, which releases the opening lever of the ballot box VTP1, the indicator V1 is switched on. The lever L1 can be actuated by the ballot box responsible, the hatch opens and the coded contact C3 integrated into the lever is open. After introduction of the envelope in VTP1, the lever L1 is returned to the initial position and closes the coded electrical contact C3 integrated into the lever L1 and connected and decoded by the identification system ID1, and thus acknowledges the vote. The indicator V2 indicating "vote cast" is then switched on for a few seconds. All mechanical activation or validation actions are visible but inaccessible.

Thus, according to a third aspect, the present invention is directed to a counting of postal votes system by reading an electronic label associated with a voting ballot, which includes a means for reading information representative of a voting ballot validation code in a memory of the electronic label.

More particularly:

In embodiments, the information representative of a ballot validation code includes, in an encrypted manner, a voting ballot lot number and/or a random number, the counting of votes system including, in addition, a means for receiving an encryption or decryption key corresponding to the encryption implemented to encrypt the voting ballot lot number and/or the random number.

In embodiments, the information representative of a ballot validation code includes, in an encrypted manner by a ballot lot number and/or a random number, then by a remote server, an identification of the user's choice from the possible choices during the election, the counting of votes system including, in addition, a means for receiving encryption or decryption keys corresponding to the encryption operations implemented to encrypt the ballot lot number and/or the random number.

In embodiments, the counting of votes system includes a means for writing in the memory of the electronic label associated with the voting ballot, information representative of counting, by the counting system, the vote borne by the ballot.

The invention claimed is:

1. A postal voting method, that includes:
connecting a user terminal to a first server;
authenticating an user of the user terminal by the first server, and associating a single user's voting number with the user;
storing, by a second server, the user's voting number;
a user voting,
verifying that it is the first vote by the user;
if this is the first user's vote:
  transmitting, by the second server to the user terminal, a physical ballot validation code,
  registering, by the user terminal in an electronic label, information representative of the physical ballot validation code, and
  transmitting, by the second server to a counting of votes system, a physical ballot validation element, the counting of votes system being distinct from the second server;
by the counting of votes system, for each physical voting ballot associated with an electronic label, reading the information representative of the validation code in said electronic label; and
verifying correspondence between the information representative of the validation code read and the validation element received by the counting system and, only if this verification is positive, taking account of the ballot associated with said electronic label.

2. The method according to claim 1, wherein transmitting, by the second server to the user terminal, a ballot validation code, the user terminal transmits to the second server a ballot lot number and/or a random number and the second server encrypts each number received from the user terminal and returns each encrypted number to the user terminal.

3. The method according to claim 1, wherein when transmitting, by the second server to the user terminal, a ballot validation code, the user terminal encrypts an identification of the choice of the user from the possible choices during the election, with, as an encryption key, a ballot lot number and/or a random number, and transmits the encrypted choice identification to the second server, the second server encrypting this encrypted choice identification and returning the encrypted choice identification to the user terminal.

4. The method according to claim 1, which includes, after authenticating the user of the user terminal by the first server, transmitting to the user a plurality of voting ballots, bearing, in a visible and legible manner, a possible choice during the election, each voting ballot being physically linked to an electronic label retaining, in memory, the identification of the choice borne by the ballot.

5. The method according to claim 4, wherein the identification of the choice borne by the ballot is retained encrypted into the memory of the electronic label.

6. The method according to claim 1, which includes transmitting to the user a first code PIN1 for accessing the content of a first part of the memory of each electronic label received by the user, this first part retaining a vote identifier and/or an identification of the choice made by the user during the election.

7. The method according to claim 6, which includes modifying, by the user terminal, the first code PIN1 together with registering, by the user terminal in an electronic label, information representative of the ballot validation code.

8. The method according to claim 1, which includes transmitting, by the second server to the user terminal, a second code PIN2 for accessing the content of a second part of the memory of each electronic label received by the user, this second part retaining the information representative of the ballot validation code.

9. The method according to claim 1, which includes registering, into memory of each electronic label received by the user, a ballot lot number common to the electronic labels of several users.

10. The method according to claim 1, which includes sticking an electronic label on a ballot bearing a visible and legible identification of the choice made by the user from the possible choices during the election, capturing an image of the ballot bearing the electronic label stuck by the user terminal, encrypting this image and storing the electronic label of this encrypted image together with registering, by the user terminal in an electronic label, information representative of the ballot validation code.

11. The method according to claim 10, which includes an optical character recognition of the identification of the choice made by the user from the possible choices during the election borne by the ballot on which the electronic label is stuck, and registering, by the user terminal into the memory of the electronic label, information representative of the identification read by optical character recognition.

12. The method according to claim 1, which includes sticking an electronic label on an envelope containing the ballot bearing a visible and legible identification of the choice made by the user from the possible choices during the election.

13. The method according to claim 1, which includes transmitting, by the user to a voting place, a voting ballot associated with an electronic label, in an envelope forming a Faraday cage.

14. An electronic label for the implementation of a postal voting method, by association of said electronic label with a voting ballot, said electronic label including a memory including information representative of a ballot validation code, said postal voting method comprising:

connecting a user terminal to a first server;
authenticating an user of the user terminal by the first server, and associating a single user's voting number with the user;
storing, by a second server, the user's voting number;
a user voting,
verifying that it is the first vote by the user;
if this is the first user's vote:
- transmitting, by the second server to the user terminal, a physical ballot validation code,
- registering, by the user terminal in an electronic label, information representative of the physical ballot validation code, and
- transmitting, by the second server to a counting of votes system, a physical ballot validation element, the counting of votes system being distinct from the second server;

by the counting of votes system, for each physical voting ballot associated with an electronic label, reading the information representative of the validation code in said electronic label; and
verifying correspondence between the information representative of the validation code read and the validation element received by the counting system and, only if this verification is positive, taking account of the ballot associated with said electronic label.

15. The electronic label of claim 14, wherein the information representative of a ballot validation code includes, in an encrypted manner, a ballot lot number and/or a random number.

16. The electronic label according to claim 14, wherein the information representative of a ballot validation code includes, in an encrypted manner by a ballot lot number and/or a random number, and then by a remote server, an identification of the user's choice from the possible choices during the election.

17. The electronic label according to claim 14, wherein the memory further includes an image of a voting ballot on which this electronic label is stuck.

18. The electronic label according to claim 14, wherein the memory further includes information representative of counting, by a ballot box, the vote borne by the ballot.

19. A vote counting of system for implementing the postal voting method, by reading an electronic label associated with a voting ballot, which includes a reader of information representative of a voting ballot validation code in a memory of the electronic label,
said postal voting method comprising:
connecting a user terminal to a first server;
authenticating an user of the user terminal by the first server, and associating a single user's voting number with the user;
storing, by a second server, the user's voting number;
a user voting,
verifying that it is the first vote by the user;
if this is the first user's vote:
- transmitting, by the second server to the user terminal, a physical ballot validation code,
- registering, by the user terminal in an electronic label, information representative of the physical ballot validation code, and
- transmitting, by the second server to a counting of votes system, a physical ballot validation element, the counting of votes system being distinct from the second server;

by the counting of votes system, for each physical voting ballot associated with an electronic label, reading the information representative of the validation code in said electronic label; and
verifying correspondence between the information representative of the validation code read and the validation element received by the counting system and, only if this verification is positive, taking account of the ballot associated with said electronic label.

20. The vote counting system according to claim 19, wherein the information representative of a ballot validation code includes, in an encrypted manner, a voting ballot lot number and/or a random number, the counting of votes system further including a receiver of an encryption or decryption key corresponding to the encryption implemented to encrypt the voting ballot lot number and/or the random number.

21. The vote counting system according to claim 19, wherein the information representative of a voting ballot validation code includes, in an encrypted manner by a ballot lot number and/or a random number and then by a remote server, an identification of the user's choice from the possible choices during the election, the counting of votes system further including, a receiver of encryption or decryption keys corresponding to the encryption operations implemented to encrypt the ballot lot number and/or the random number.

22. The vote counting system according to claim 19, which includes a writer that writes into the memory of the electronic label associated with the voting ballot, information representative of counting, by the counting of votes system, the vote borne by the ballot.

* * * * *